(12) United States Patent  (10) Patent No.: US 8,581,995 B2
Lin et al.  (45) Date of Patent: Nov. 12, 2013

(54) METHOD AND APPARATUS FOR PARALLAX CORRECTION IN FUSED ARRAY IMAGING SYSTEMS

(75) Inventors: Peng Lin, Pleasanton, CA (US); Scott Smith, San Jose, CA (US); Robert A. Black, Milpitas, CA (US)

(73) Assignee: Aptina Imaging Corporation, George Town (KY)

( * ) Notice: Subject to any disclaimer, the term of this patent is extended or adjusted under 35 U.S.C. 154(b) by 242 days.

(21) Appl. No.: 13/110,252

(22) Filed: May 18, 2011

(65) Prior Publication Data

US 2012/0188389 A1 Jul. 26, 2012

Related U.S. Application Data

(60) Provisional application No. 61/436,024, filed on Jan. 25, 2011.

(51) Int. Cl.
*H04N 5/225* (2006.01)

(52) U.S. Cl.
USPC ........................................ 348/218.1; 348/252

(58) Field of Classification Search
USPC .................... 348/218.1, 222.1, 252
See application file for complete search history.

(56) References Cited

U.S. PATENT DOCUMENTS

| 7,239,805 B2 | 7/2007 | Uyttendaele et al. | |
| 2008/0259201 A1* | 10/2008 | Iijima et al. | 348/345 |
| 2010/0259626 A1 | 10/2010 | Savidge | |
| 2011/0069200 A1 | 3/2011 | Oh et al. | |
| 2011/0108708 A1* | 5/2011 | Olsen et al. | 250/208.1 |
| 2011/0157319 A1* | 6/2011 | Mashitani et al. | 348/49 |

OTHER PUBLICATIONS

Gyaourova, "Block matching for object tracking" Oct. 14, 2003 [Retrieved on May 18, 2011]. Retrieved from the Internet: https://computation.llnl.gov/casc/sapphire/pubs/UCRL-TR-200271.pdf.

\* cited by examiner

*Primary Examiner* — Gevell Selby
(74) *Attorney, Agent, or Firm* — Treyz Law Group; Louis R. Levenson (57) ABSTRACT

Electronic devices may include camera modules. A camera module may include an array camera having an array of lenses and an array of corresponding image sensors. Parallax correction and depth mapping methods may be provided for array cameras. A parallax correction method may include a global and a local parallax correction. A global parallax correction may be determined based on one-dimensional horizontal and vertical projections of edge images. Local parallax corrections may be determined using a block matching procedure. Further improvements to local parallax corrections may be generated using a relative block color saturation test, a smoothing of parallax correction vectors and, if desired, using a cross-check between parallax correction vectors determined for multiple image sensors. Three dimensional depth maps may be generated based on parallax correction vectors.

18 Claims, 10 Drawing Sheets

FIG. 11

METHOD AND APPARATUS FOR PARALLAX CORRECTION IN FUSED ARRAY IMAGING SYSTEMS

This application claims the benefit of provisional patent application No. 61/436,024, filed Jan. 25, 2011, which is hereby incorporated by reference herein in its entirety.

BACKGROUND

This relates generally to imaging devices, and more particularly, to imaging devices with multiple lenses and multiple image sensors.

Image sensors are commonly used in electronic devices such as cellular telephones, cameras, and computers to capture images. In a typical arrangement, an electronic device is provided with a single image sensor and a single corresponding lens. Some electronic devices use arrays of image sensors and corresponding lenses to gather image data. This type of system, which is sometimes referred to as an array camera, may be used to extend depth of focus, increase output resolution through super-resolution processing, and capture depth information from a scene.

In a conventional array camera, due to a physical offset of the image sensors and corresponding lenses, objects may appear at different positions in images captured by different image sensors. This effect (called parallax) affects objects at different distances from the imaging device differently (i.e., objects near to the imaging device have a larger parallax than objects far from the imaging device). Images of real-world scenes captured by array cameras often contain objects at multiple distances from the array camera. A single parallax correction for all objects in an image is therefore insufficient.

It would therefore be desirable to be able to provide improved methods for parallax correction and depth mapping for imaging devices with array cameras.

DETAILED DESCRIPTION

Digital camera modules are widely used in electronic devices such as digital cameras, computers, cellular telephones, and other electronic devices. These electronic devices may include image sensors that gather incoming light to capture an image. The image sensors may include arrays of image pixels. The pixels in the image sensors may include photosensitive elements such as photodiodes that convert the incoming light into digital data. Image sensors may have any number of pixels (e.g., hundreds or thousands or more). A typical image sensor may, for example, have hundreds, thousands, or millions of pixels (e.g., megapixels).

Figure 1:
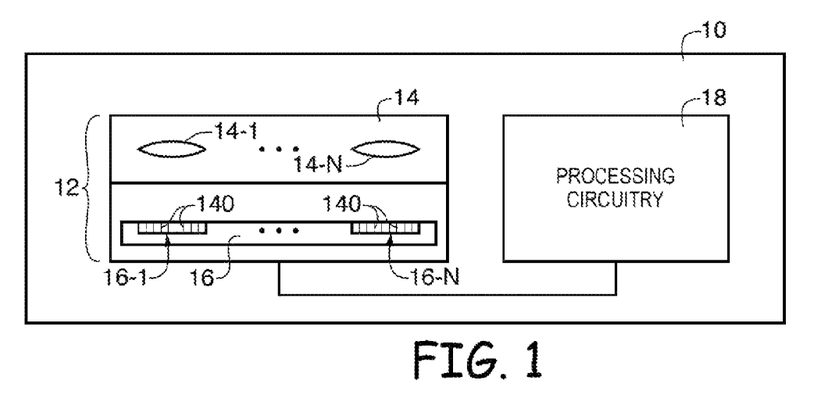
FIG. 1 is a diagram of an illustrative electronic device that contains a camera module with an array of lenses and an array of corresponding image sensors in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include an array of lenses 14 and a corresponding array of image sensors 16. During image capture operations, light from a scene may be focused onto image sensors 16-1, . . . 16-N using respective lenses 14-1, . . . 14-N. Lenses 14 and image sensors 16 may be mounted in a common package and may provide image data to processing circuitry 18.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

There may be any suitable number of lenses in lens array 14 and any suitable number of image sensors in image sensor array 16. Lens array 14 may, as an example, include N*M individual lenses arranged in an N×M two-dimensional array. The values of N and M may be equal or greater than two, may be equal to or greater than three, may exceed 10, or may have any other suitable values. Image sensor array 16 may contain a corresponding N×M two-dimensional array of individual image sensors. The image sensors may be formed on one or more separate semiconductor substrates. With one suitable arrangement, which is sometimes described herein as an example, the image sensors are formed on a common semiconductor substrate (e.g., a common silicon image sensor integrated circuit die). Each image sensor may be identical or there may be different types of image sensors in a given image sensor array integrated circuit. Each image sensor may be a Video Graphics Array (VGA) sensor with a resolution of 480×640 sensor pixels (as an example). Other types of sensor pixels may also be used for the image sensors if desired. For example, images sensors with greater than VGA resolution sensor (e.g., high-definition image sensors) or less than VGA resolution may be used, image sensor arrays in which the image sensors are not all identical may be used, etc.

The use of a camera module with an array of lenses and an array of corresponding image sensors (i.e., an array camera) may allow images to be captured with increased depth of field because each image sensor in the array may be smaller than a conventional image sensor. The reduced image sensor size allows the focal length of each lens in the lens array to be reduced relative to that of a conventional single-lens configuration. Color cross-talk may also be reduced, because a single color filter can be used for each sub-array instead of using a conventional Bayer pattern or other multiple-color color filter array pattern. With a single color filter arrangement of this type, there is no opportunity or color information to bleed from one channel to another. As a result, signal-to-noise ratio and color fidelity may be improved.

The color filters that are used for the image sensor pixel arrays in the image sensors may, for example, be red filters, blue filters, and green filters. Each filter may form a color filter layer that covers the image sensor pixel array of a respective image sensor in the array. Other filters such as infrared-blocking filters, filters that block visible light while passing infrared light, ultraviolet-light blocking filters, white color filters, etc. may also be used. In an array with numerous image sensors, some of the image sensors may have red filters, some may have blue color filters, some may have green color filers, some may have patterned color filters (e.g., Bayer pattern filters, etc.), some may have infrared-blocking filters, some may have ultraviolet light blocking filters, some may be visible-light-blocking-and-infrared-passing filters, etc.

The image sensor integrated circuit may have combinations of two or more, three or more, or four or more of these filters or may have filters of only one type. Processing circuitry 18 (e.g., processing circuitry integrated onto sensor array integrated circuit 16 and/or processing circuitry on one or more associated integrated circuits) can select which digital image data to use in constructing a final image for the user of device 10. For example, circuitry 18 may be used to blend image data from red, blue, and green sensors to produce full-color images, may be used to select an infrared-passing filter sensor when it is desired to produce infrared images, may be used to produce 3-dimensional images using data from two or more different sensors that have different vantage points when capturing a scene, etc.

In some modes of operation, all of the sensors on array 16 may be active (e.g., when capturing high-quality images). In other modes of operation (e.g., a low-power preview mode), only a subset of the image sensors may be used. Other sensors may be inactivated to conserve power (e.g., their positive power supply voltage terminals may be taken to a ground voltage or other suitable power-down voltage and their control circuits may be inactivated or bypassed).

Figure 2:
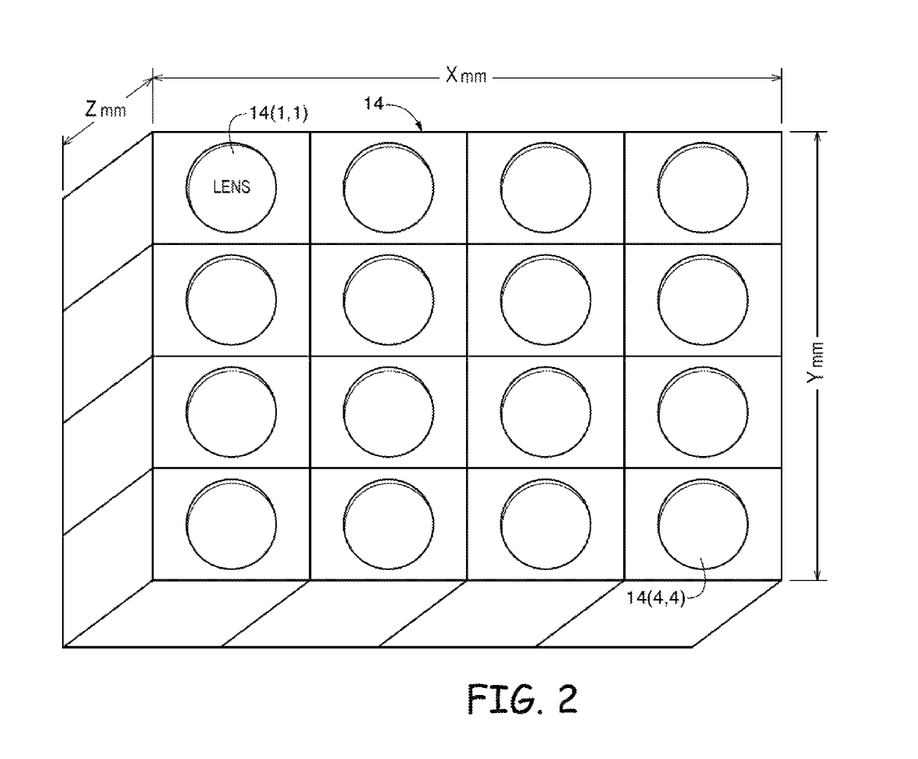
FIG. 2 is a perspective view of an illustrative camera module having an array of lenses in accordance with an embodiment of the present invention.

FIG. 2 is a perspective view of an illustrative camera module having an array 14 of lenses (e.g., lenses such as lenses 14(1,1), and 14(4,4)). The array of lenses may, for example, be a rectangular array having rows and columns of lenses. The lenses may all be equally spaced from one another or may have different spacings. There may be any suitable number of lenses 14 in the array. In the FIG. 2 example, there are four rows and four columns of lenses.

Figure 3:
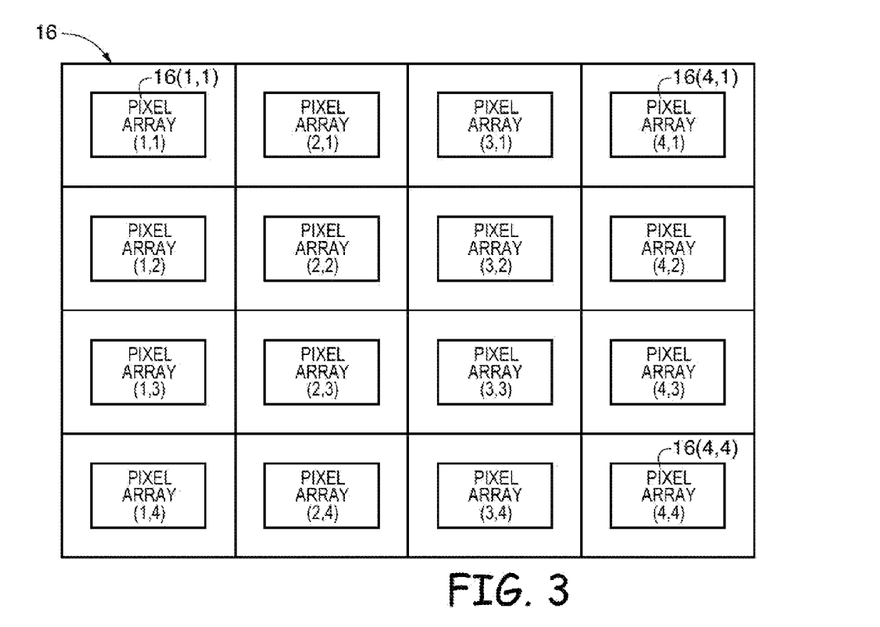
FIG. 3 is a diagram of an illustrative sensor array of the type that may be used with the lens array of FIG. 2 in a camera module in accordance with an embodiment of the present invention.

An illustrative sensor array of the type that may be used with the lens array of FIG. 2 is shown in FIG. 3. As shown in FIG. 3 sensor array 16 may include image sensors such as sensor 16(1,1), 16(4,1), and 16(4,4). The array of FIG. 3 has sixteen image sensors, but, in general, array 16 may have any suitable number of image sensors (e.g., two or more sensors, four or more sensors, ten or more sensors, 20 or more sensors, etc.).

Figure 4:
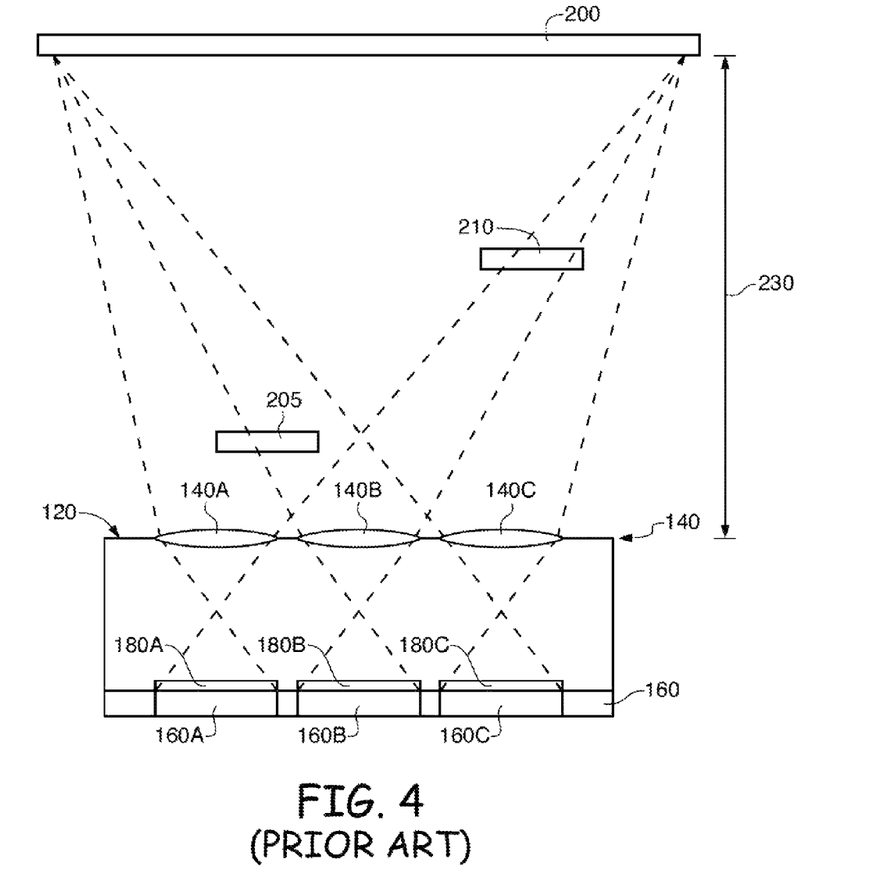
FIG. 4 is a diagram of a conventional camera module arrangement in which the camera module includes an array of lenses and corresponding image sensors.

A diagram of a conventional array camera with an array of identical lenses and corresponding image sensors is shown in FIG. 4. In the example of FIG. 4, array camera (camera module 120) has a lens array 140 that is made up of three lenses: lenses 140A, 140B, and 140C. Lenses 140A, 140B, and 140C each focus image light from an objects such as objects, 200, 205, and 210, onto a respective image sensor in image sensor array 160. In particular, lens 140A may be used to focus image light onto image sensor 160A, lens 140B may be used to focus image light onto image sensor 160B, and lens 140C may be used to focus image light onto image sensor 160C. Each image sensor is also associated with a color filter.

In a typical arrangement, color filter 180A is a red color filter, color filter 180B is a green color filter, and color filter 180C is a blue color filter. With a camera array of the type shown in FIG. 4, objects such as far-field object 200 will appear at the same position in images captured by image sensors 160A, 160B, and 160C. Objects such as objects 205 and 210 that are near to array camera 120 will appear in different positions in images captured by image sensors 160A, 160B, and 160C due to the physical offsets between image sensors 160A, 160B, and 160C. This parallax effect (i.e., the effect in which objects appear at different positions in images captured by physically offset image sensors) may produce undesirable results when combining images to form a single color image. Parallax is more pronounced for objects at short distances from the array camera than for images at large distances from the array camera and therefore a single image parallax correction is not sufficient. It is therefore desirable to provide both a global and local parallax correction for array cameras.

Information obtained during parallax correction operations may also be used to obtain 3-dimensional depth information about objects in a scene. The magnitude of a parallax correction for a given object is inversely proportional to the 3-dimensional distance of the object from the imaging device. The parallax corrections for multiple objects in a scene may therefore be used to form a depth map for the scene (e.g., for a rear-view camera with object distance warning capabilities in an automobile).

Figure 5:
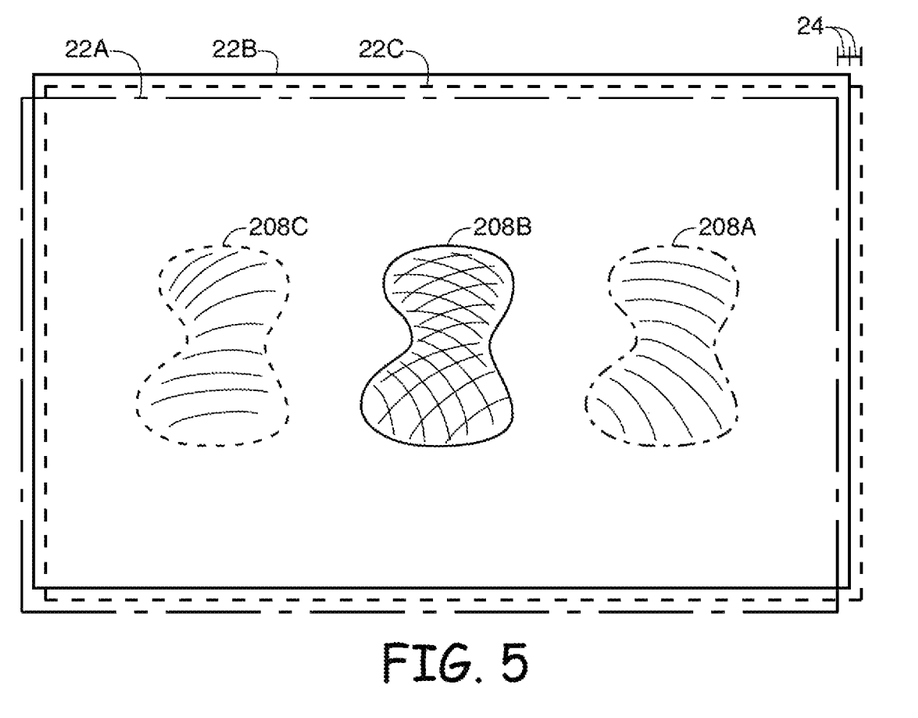
FIG. 5 is an illustrative diagram showing images of an object from the image sensors of the conventional camera module of FIG. 4 appearing at different locations in an image due to parallax.

As shown in FIG. 5, for example, an array camera may capture images such as image 22A, image 22B, and image 22C that overlap substantially. Image 22A may (as an example) be captured using pixel array (1,1) of FIG. 3. Image 22B may be captured using pixel array (2,1). Image 22C may be captured using pixel array (3,1). In practice, due to alignment variations and other manufacturing variations, the amount of lateral mismatch 24 between images 22A, 22B, and 22C may be negligible (e.g., less than a few pixels). Following image capture of images 22A, 22B, and 22C with the array camera, these individual images may be merged to produce a final image. Images 22A, 22B, and 22C may contain an object such as object 208. Due to parallax caused by the physical offset of image sensors (1,1), (2,1), and (3,1), object 208 may appear in different positions in images 22A, 22B, and 22C as shown in FIG. 5. Without correction for parallax, a combined color image will contain three images 208A, 208B, and 208C each having a color corresponding to color filters associated with pixel arrays (1,1), (2,1), and (3,1) respectively.

Figure 6:
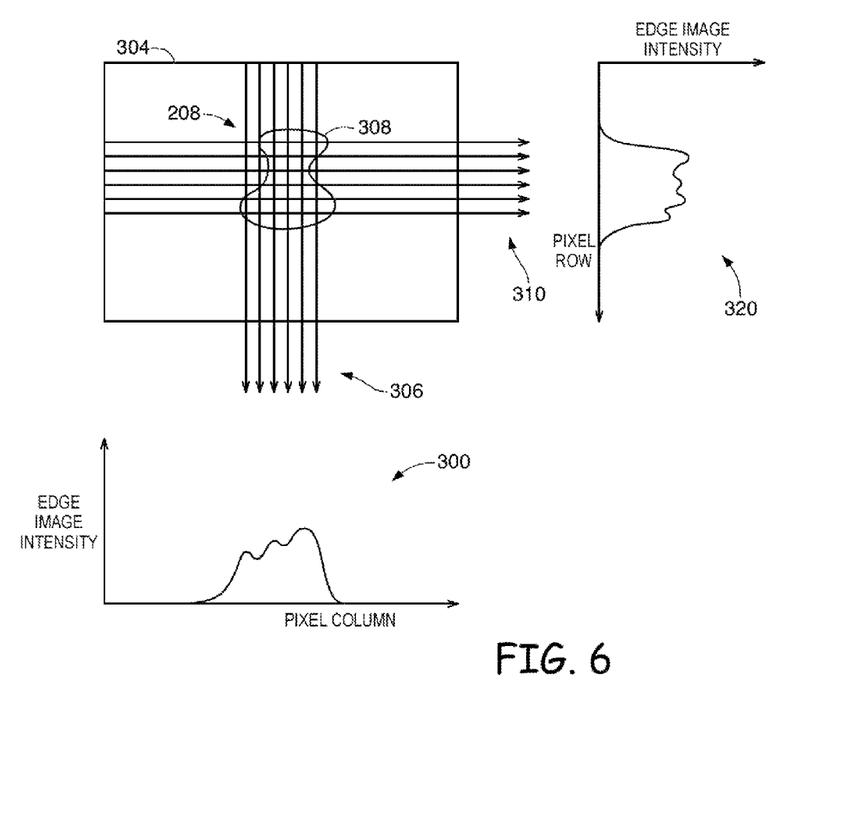
FIG. 6 is a diagram showing an illustrative projection of image pixel values associated with an object may be projected into one-dimensional horizontal and vertical projection graphs in accordance with an embodiment of the present invention.

Since natural scenes usually contain objects at multiple distances from the camera, the parallax shift in an image may not be the same in one portion of an image as in another portion of an image. A parallax correction for array cameras may therefore include both a global parallax correction (e.g., an average correction based on all objects in a scene) and a local parallax correction (e.g., a correction based on objects in a localized portion of a scene). FIG. 6 is a diagram showing a method for collection of image data as a part of a global parallax correction. For a given image such as image 22B of FIG. 5 containing objects such as object 208, and edge image such as edge image 304 may be computed. Edge image 304 may be computed from image 22B (or any image obtained by the image sensors of FIG. 3) using an edge detection operator such as a Sobel operator in which an image I is convolved with a Sobel operator as shown in equation 1:

$$D_y = \begin{bmatrix} -1 & -2 & -1 \\ 0 & 0 & 0 \\ 1 & 2 & 1 \end{bmatrix} * I, \quad (1)$$

$$D_x = \begin{bmatrix} -1 & 0 & 1 \\ -2 & 0 & 2 \\ -1 & 0 & 1 \end{bmatrix} * I,$$

to produce x and y edge images $D_x$ and $D_y$ respectively. The edge image D (e.g., image 304) may then be computed by combining $D_x$ and $D_y$ as shown in equation 2:

$$D = \sqrt{D_x^2 + D_y^2}. \quad (2)$$

Edge image 304 may contain only the edges of objects such as object 208 (i.e., edge image 304 may have large pixel values in pixels along the edges of objects such as edge 308 of object 208). Other portions of object 208 (e.g. central portions) may be suppressed by the convolution of image 22B with the edge operator. Pixels in vertical pixel columns may be combined (e.g., averaged as indicated by lines 306) to form a 1-dimensional graph such as graph 300 (e.g., showing average edge image intensity of a pixel column vs. pixel column. Similarly, pixels in horizontal pixel rows may be combined (e.g., average as indicated by lines 310) to form a 1-dimensional graph such as graph 320 (e.g., showing average edge image intensity of a pixel row vs. pixel row). Graphs 300 and 320 of vertical and horizontal image intensity may be produced for a single object in a single image or may be produced for multiple objects in a single image.

Figure 7:
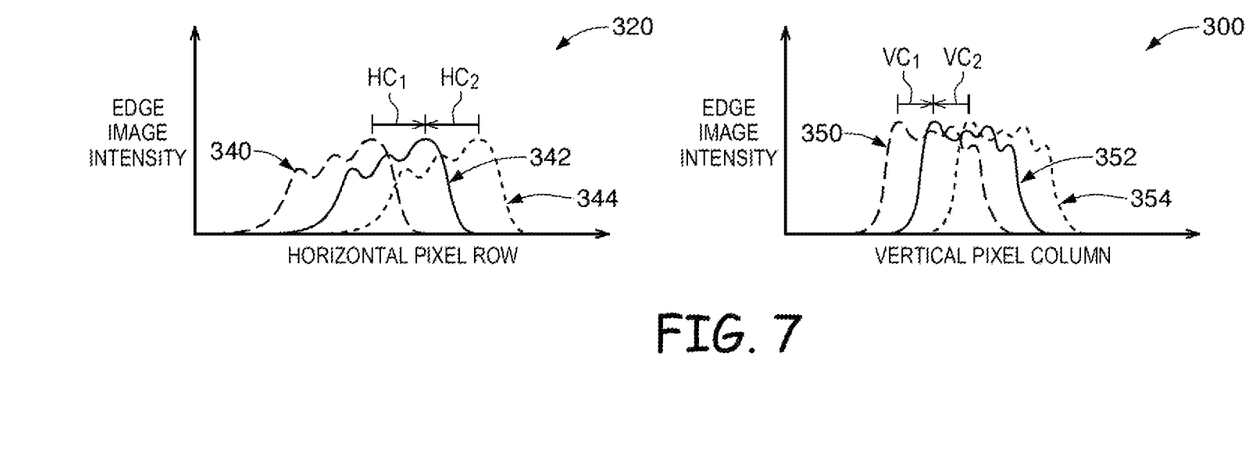
FIG. 7 contains two illustrative graphs showing measured horizontal and vertical offsets of an object due to parallax in accordance with an embodiment of the present invention.

Graphs 300 and 320 may be produced from a common object or a set of common objects in images obtained by multiple image sensors (e.g., image sensors 16I-16N of FIG. 3). In the example of FIG. 7, three edge images produced from three images captured using three image sensors, result in the three curves each in graphs 320 and 300. One-dimensional horizontal projection curves 340, 342, and 344 of horizontal projection graph 320 may (as an example) result from edge images computed from images 22A, 22B, and 22C, respectively. Similarly, one-dimensional vertical projection curves 350, 352, and 354 of vertical projection graph 320 may result from edge images computed from images 22A, 22B, and 22C, respectively. Using curves 340 and 342, a global horizontal parallax correction HC1 may be obtained between images 22A and 22B. Similarly, using curves 342 and 344, a global horizontal parallax correction HC2 may be obtained between images 22B and 22C.

Horizontal parallax correction HC1 may be determined by computing the sum-of-absolute differences (SAD) between curves 340 and 342 for various test shifts in curve 340. For example, a test shift of one pixel row may be chosen in which curve 340 is shifted right by one pixel row. The edge image intensity values of curves 340 and 342 at each pixel row may then be subtracted. The absolute value of each difference may then be computed and sum the absolute differences calculated. The process may be repeated for other test shifts (e.g., right by two rows, left by 5 rows, or any other test shift). Horizontal parallax correction HC1 may be chosen to be the test shift that results in the smallest SAD. Other methods may be used to determine HC1 such as a least-sum-of-squares or other method. Global horizontal parallax correction HC2 may be chosen to be the shift in curve 344 that results in the smallest SAD between curves 342 and 344.

Global horizontal parallax corrections HC1 and HC2 may be similar in magnitude and opposite in direction or may be different in magnitude depending on the physical separation of the image sensors used to capture images 22A, 22B, and 22C. Image 22A may be adjusted using horizontal parallax correction HC1 to match image 22B (e.g., the pixels of image 22A may be shifted by an amount equal to HC1 to overlap different pixels of image 22B). Image 22C may be adjusted using horizontal parallax correction HC2 to match image 22C. Corrected images 22A and 22C may then be combined with image 22C to form a color image, a stereoscopic image or depth map. In an alternative embodiment, images 22B and 22C may be corrected to match image 22A or image 22A, 22B, and 22C may be corrected to match another image captured by an additional image sensor.

In a similar manner to the determination of horizontal parallax corrections HC1 and HC2, global vertical parallax corrections VC1 and VC2 may be determined using curves 350, 352, and 354 of graph 300. Global vertical parallax correction VC1 may be determined using the smallest SAD resulting from test shifts of curve 350 with respect to curve 352. Global vertical parallax correction VC2 may be determined using the smallest SAD resulting from test shifts of curve 354 with respect to curve 352. Global vertical parallax correction VC1 may be used, for example, to correct image 22A to match image 22B (e.g., by shifting the pixels of image 22A by a VC1 pixels to overlap different pixels of image 22B). Global vertical parallax correction VC2 may be used, for example, to correct image 22C to match image 22B (e.g., by shifting the pixels of image 22C by a VC1 pixels to overlap different pixels of image 22B). In an another arrangement, images 22B and 22C may be corrected to match image 22A or image 22A, 22B, and 22C may be corrected to match another image captured by an additional image sensor. Global parallax corrections based on global parallax corrections HC1, HC2, VC1, and VC2 may provide an overall improvement in matching images captured by multiple image sensors in an array camera. However, as multiple objects in an image may have different parallax offsets (due to different distances from the imaging device), a local parallax correction for each pixel of each image is also desirable.

Figure 8A:
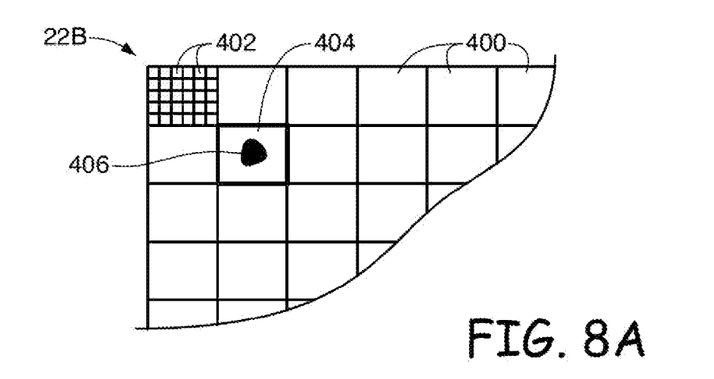
FIG. 8 is an illustrative diagram of a block matching procedure for local parallax correction in which an imaged object appears in different image blocks in images captured by different sensors in accordance with an embodiment of the present invention.
Figure 8B:
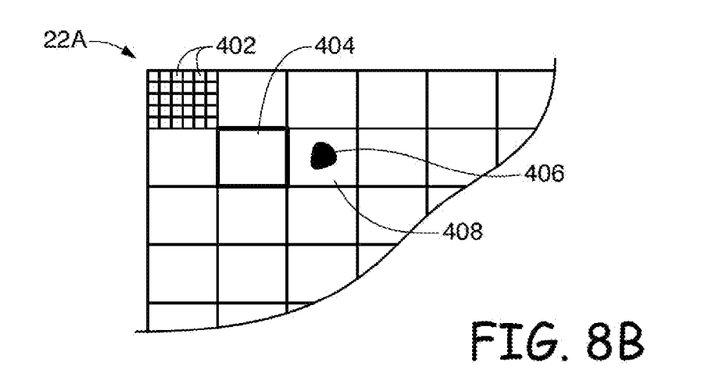
Figure 8C:
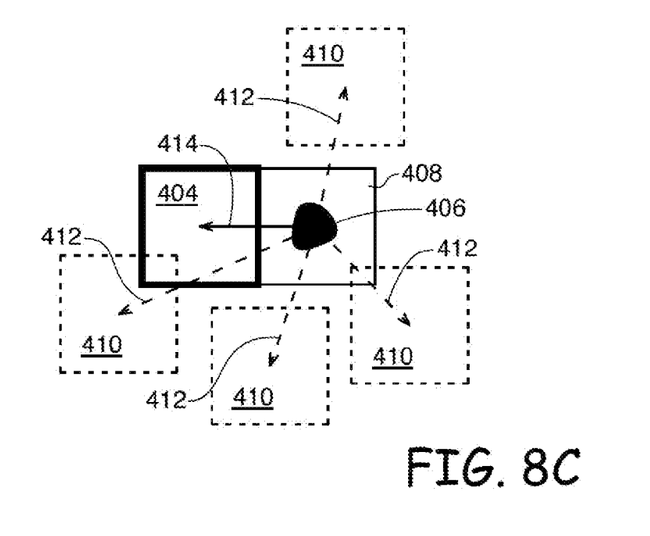

FIGS. 8A 8B, and 8C collectively show a diagram of an illustrative method for determining local parallax corrections using image blocks that include a sub-group of pixels in images captured by the image sensors of an array camera. FIG. 8A shows a portion of an illustrative image such as image 22B. Image 22B is divided into image blocks 400.

Each image block 400 contains a plurality of pixels 402. Image blocks 400 may include an equal number of pixel rows and pixel columns (e.g., square blocks of 2 pixel row and 2 pixel columns, 3, pixel rows and 3 pixel columns, 10 pixel rows and 10 pixel columns or any other equal number of pixel rows and pixel columns). Alternatively, image blocks 400 may include a different number of pixel rows and pixel columns (e.g., rectangular blocks of 1 pixel row and 3 pixel columns, 5 pixel rows and 3 pixel columns, or any other suitable combination of pixel rows and pixel columns).

If desired, image blocks 400 may have a shape that is neither square nor rectangular (e.g., a pixel block containing 3 pixels of one pixel row, 5 pixels of another pixel row, 10 pixels of a third pixel row, or any arbitrary grouping of adjacent pixels). All image blocks 400 may include the same number of pixels or some image blocks 400 may include different numbers of pixels than other image blocks 400. All image blocks 400 may have the same shape (e.g., all image blocks 400 may be square or all image blocks 400 may be rectangular), or some image blocks 400 may have different shapes than other image blocks 400 (e.g., some square image blocks, some rectangular image blocks, and some non-square and non-rectangular image blocks). As shown in FIG. 8A, image 22B may include an object such as object 406. Object 406 may be partially or completely contained in a particular image block such as image block 404. The size and shape of each image block 400 may be chosen arbitrarily or may be optimized based on image contents (e.g., the size and shape of a particular image block may be chosen to correspond to the size and shape of an object such as object 406).

FIG. 8B shows a portion of an illustrative image such as image 22A captured by an image sensor other than the image sensor that captured image 22B. As shown in FIG. 8B, due to parallax caused by the offset between image sensors, object 406 appears in a different pixel block (e.g., pixel block 408) in image 22A than in image 22B. In order to correct for the local parallax (i.e., object 406 appearing in pixel block 408 of image 22A and pixel block 404 of image 22B), a block matching procedure may be applied. In a block matching procedure, processing circuitry such as processing circuitry 18 may be used to compute a block energy difference for image block 404 of image 22B and various shifts of image block 408 in image 22A.

FIG. 8C is a zoomed view of image block 404 and image block 408 of image 22A. As shown in FIG. 8C, various test blocks such as test block 410 may be chosen. Test blocks 410 may be shifted with respect to image block 408 by test shifts 412. Test shifts 412 may be horizontal shifts, may be vertical shifts, or a combination of horizontal and vertical shifts. Test shifts 412 may be larger than the size of block 408 or maybe smaller than the size of block 408. The number of test shifts 412 used may be predetermined or may be chosen based on image characteristics. For each test block 410 a block energy difference may be computed between test block 410 of image 22A and the overlapping test block 410 of image 22B. For each test block 410 the block energy difference may also, if desired, be computed between test block 410 of an edge image determined from image 22A and overlapping test block 410 of an edge image determined from image 22B. Block energy differences may be computed by processing circuitry 18 using the following equation:

$$E = \alpha \cdot \sum_{x,y \in Block} |I_G(x,y) - I_{R(B)}(x,y)| + \beta \cdot \sum_{x,y \in Block} |D_G(x,y) - D_{R(B)}(x,y)| \quad (3)$$

In equation 3, E is the block energy difference, $I_G(x,y)$ is the image intensity of a pixel (x,y) in, for example, an image captured using a green (G) image sensor, $I_{R(B)}(x,y)$ is the image intensity of a pixel (x,y) in, for example, an image captured using a red (R) or blue (B) image sensor. In equation 3, $D_G(x,y)$ is the edge image intensity of a pixel (x,y) in, for example, an edge image computed from an image captured using a green (G) image sensor, $D_{R(B)}(x,y)$ is the edge image intensity of a pixel (x,y) in, for example, an edge image computed from an image captured using a red (R) or blue (B) image sensor. The sums in equation 3 are performed over all pixels (x,y) in test block 410 (i.e., Block in equation 3 indicates test block 410). In order to apply equation 3 to the images 22A and 22B of FIGS. 8A, 8B, and 8C, $I_G(x,y)$ may represent the pixel intensity values in test block 410 (having a test shift 412) of image 22B while $I_{R(B)}(x,y)$ may represent the pixel intensity values in block 408 of image 22A.

Parameters α and β of equation 3 may be chosen to more strongly weight the contribution to block energy difference E of an image over an associated edge image or of an edge image over an associated image. As an example, α=β=0.5 may be used to equally weight the contributions from image and associated edge image. Alternative choices may include (α=1, β=0; to use only the images), (α=0, β=1; to use only the edge images) or any other combination of α and β in which α+β=1.

The shift 412 resulting in the test block 410 having the lowest block energy difference E may be chosen to have the correct shift. In the example of FIG. 8C, the correct shift (i.e., shift 414) shifts image block 408 onto image block 404. In practice, correct shift 414 may shift image block 408 of image 22A exactly onto an image block of image 22B or may shift image block 408 of image 22A partially onto several blocks 400 of image 22B. Correct shift 414 may be stored using processing circuitry 18 as a block parallax correction vector in a local parallax correction map such as local parallax correction map 500 of FIG. 9. Test block 410 corresponding to correct shift 414 may be considered the matched block of image 22B corresponding image block 408 of image 22A.

Figure 9:
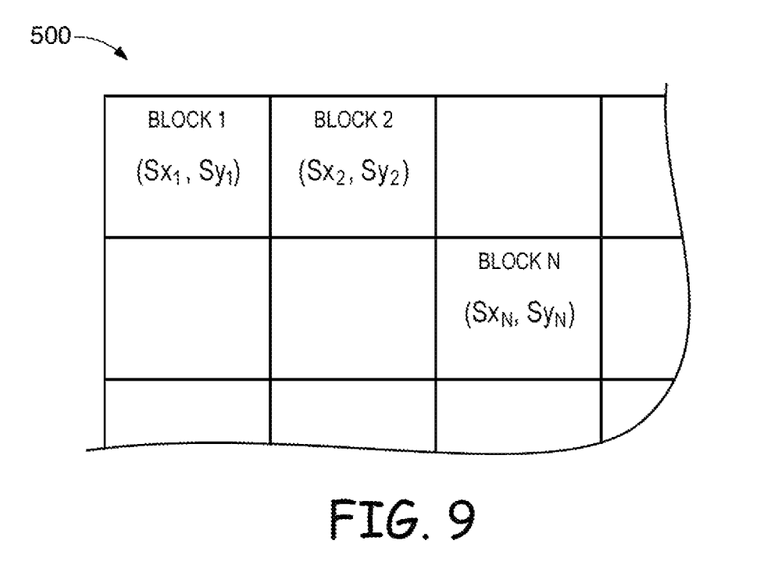
FIG. 9 is a diagram of a local parallax correction map in accordance with an embodiment of the present invention.

As shown in FIG. 9, local parallax correction map 500 contains a single block parallax correction vector for each block (e.g., vector ($S_{X1}$, $S_{Y1}$) of block 1, vector ($S_{X2}$, $S_{Y2}$) of block 2, and vector ($S_{XN}$, $S_{YN}$) of the $N^{th}$ block). A local parallax correction map 500 may be computed for images captured by each image sensor with respect to a chosen reference image sensor. As an example, local parallax correction maps may be computed for images 22A and 22C with respect to image 22B. In another arrangement, local parallax correction maps may be computed for images 22A and 22B with respect to image 22C. In the examples of FIGS. 8A, 8B, and 8C, two image sensors are used. In practice the method of computing a local parallax correction map may be applied to images captured by any number of image sensors (e.g., N*M images captured by an (N×M image sensor array).

If desired, local parallax correction map 500 may be improved by allowing the size of each image block 400 to be varied during the block matching procedure. Lowest block energy difference E resulting in correct shift 41 may be compared to a threshold. If the matched block energy difference E is above the threshold, the size of test block 410 of image 22A and overlapping test block 410 of image 22B can be reduced (e.g, each can be divided into two smaller sub-blocks, four smaller sub-blocks, etc.), and the block matching procedure can be repeated using the sub-blocks.

Local parallax correction map 500 may be improved by discarding block parallax correction vectors that incorrectly shift a block of, e.g, image 22A to a non-matching block of image 22B. Incorrect shifts of an image block to a non-matching image block of an image from an offset sensor may occur if an image captured by one image sensor is saturated while an image captured by another image sensor is not saturated. This type of relative saturation may occur when array cameras having image sensors sensitive to different colors of light are used. For example, a red object may saturate a portion of an image captured using an image sensor having an associated red color filter while the same red object may not saturate any portion of an image captured using an image sensor having an associated green color filter.

Block parallax correction vectors affected by relative color saturation may be eliminated using a block color saturation checking procedure. In a block color saturation checking procedure, processing circuitry 18 may be used to compute a block color ratio BCR between the block color energy $BCE_{R(B)}$ of block of a red (or blue) image (i.e., an image captured using an image sensor having an associated red (or blue) color filter), with the block color energy $BCE_G$ of a block of a green image (i.e., an image captured using an image sensor having an associated green color filter). The block color energy $BCE_i$ of a given image block, i, may be the sum of the image pixel values of the pixels in the block, may be the average of the pixel values of the pixels in the block, may be the sum of the squares of the image pixel values of the pixels in the block, or may be another combination of the pixel values of the pixels in the block. Block color ratio ($BCE=BCE_{R(B)}/BCE_G$) may be compared to a predetermined threshold using processing circuitry 18. If block color ratio BCE is larger than the predetermined threshold, the block parallax correction vector of the block may be discarded. The block parallax correction vector of the block may be replaced with an interpolation of block parallax correction vectors associated with neighboring blocks.

Local parallax correction map 500 may be further improved by smoothing local parallax correction map 500. Smoothing local parallax correction map 500 may be performed using processing circuitry 500 by convolving local parallax correction map 500 with a smoothing filter (e.g., a median filter or other suitable low-pass filter). Smoothing local parallax correction map 500 may reduce the occurrence of outlier block parallax correction vectors (i.e., block parallax correction vectors having values much larger or much smaller than neighboring block parallax correction vectors).

An additional improvement in local parallax correction map 500 may optionally be generated for array cameras having more than two image sensors by performing a cross-check of the block parallax correction vectors of local parallax correction maps 500. As an example, an array camera may have image sensors such as image pixel arrays (1,1), (2,1), and (3,1) of FIG. 3. The parallax of an object in an image captured by image pixel array (1,1) with respect to the position of the same object in an image captured by image pixel array (2,1) will be opposite in sign (i.e., opposite in direction) to the parallax of the same object in an image captured by image pixel array (3,1) (also with respect to the position of the same object in an image captured by image pixel array (2,1)). The parallax in images captured by image pixel arrays (1,1) and (3,1) will be opposite in sign since image pixel arrays (1,1) and (3,1) are positioned on opposite sides of image pixel array (2,1). Therefore, for an array camera having three color image sensors (e.g., a red, a green and a blue image sensor) in which the red and green image sensors are positioned on opposite sides of the green image sensor, block parallax correction vectors in local parallax correction map 500 associated with the blue image sensor should have corresponding block parallax correction vectors having opposite signs in local parallax correction map 500 associated with the red image sensor.

In a cross-check between block parallax correction vectors of local parallax correction maps 500, block parallax correction vectors associated with a image pixel array (1,1) not having associated block parallax correction vectors associated with image pixel array (3,1) with opposite signs may be discarded. Discarded block parallax correction vector may be replaced with an interpolation of block parallax correction vectors associated with neighboring blocks.

Improvements in local parallax correction maps 500 using cross-checking may be determined for any number of image sensors in an array camera using predicted relative block image correction vectors based on the positions of image sensors in an image sensor array.

Figure 10:
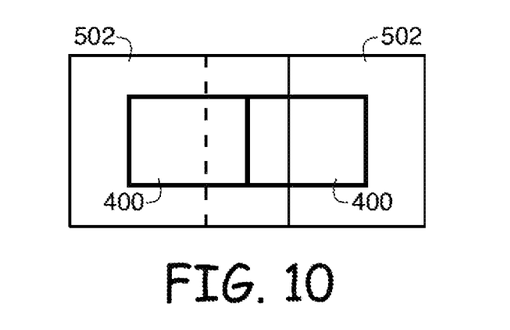
FIG. 10 is an illustrative diagram of an enlarged search block surrounding an image block of an image for parallax measurements in accordance with an embodiment of the present invention.

FIG. 10 shows another illustrative embodiment in which the determination of block parallax correction vectors may be improved. For a given image block 400 an associated expanded image block such as expanded image blocks 502 may be used during the block matching procedure described in connection with FIGS. 8A, 8B, 8C, and 9. Expanded image blocks 502 may be used as expanded test blocks such as test blocks 410 and as expanded reference image blocks such as image block 404 (see FIGS. 8A, 8C). Block energy differences E (as in equation 3) may be computed using expanded test blocks 502 and expanded reference image blocks 502. After an expanded test block having the smallest block energy difference with expanded image block 502 is identified, correct shift 414 associated with the expanded test block having the smallest block energy difference may be stored as the block parallax correction vector of unexpanded image block 400. The use of expanded image blocks 502 in the block matching procedure while storing resulting block parallax correction vectors only for unexpanded image blocks 400 may allow a larger data set to be used for searching while maintaining small image blocks.

Block parallax correction vectors may be determined to sub-pixel accuracy using super-resolution images (i.e., images with increased numbers of pixels in which image pixel values are computed by interpolating full-size image pixels) in the block matching procedure.

Correction of images affected by parallax may be performed by using processing circuitry 18 to assign the pixel intensity values of a given block to the pixels of a shifted block. The shifted block is determined by shifting the given block by the block parallax correction vector associated with the given block and stored in local parallax correction map 500. Local parallax correction map 500 may be also, if desired, be used to create a 3-dimensional depth map. The magnitude of a block correction vector in local parallax correction map 500 may be inversely proportional to the distance of a real-world object in the associated image block in the captured image. A depth map may be generated by computing the magnitudes of each block parallax correction vector in local parallax correction map 500 and inverting computed magnitudes or by other suitable methods. Depth mapping may also be performed by combing local parallax correction maps 500 determined from multiple images captured by multiple image sensors.

Figure 11:
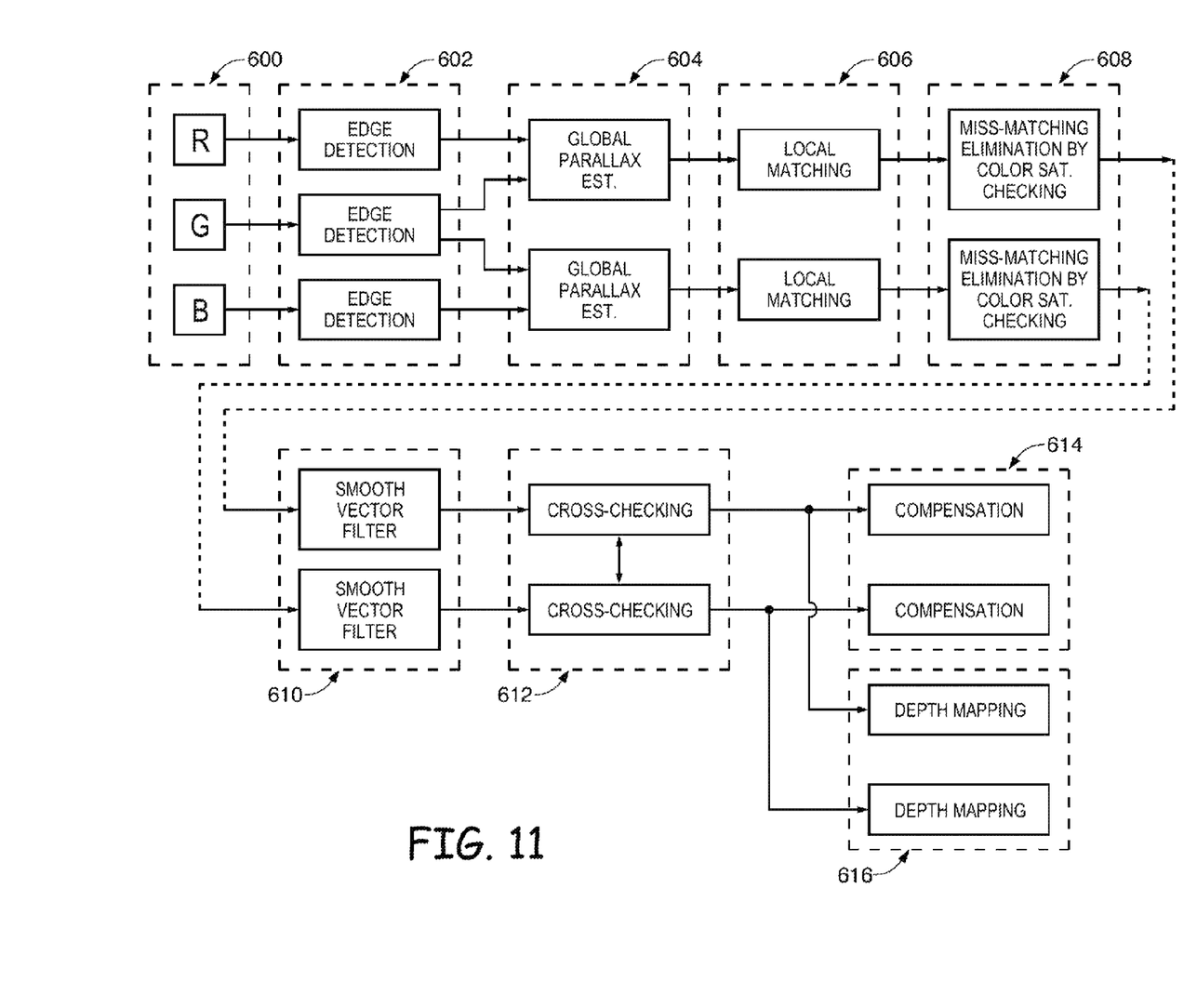
FIG. 11 is a flowchart of illustrative steps in a parallax measurement and correction method in accordance with an embodiment of the present invention.

FIG. 11 is a flowchart showing illustrative steps in computing global and local parallax corrections and depth mapping for array cameras having multiple image sensors. As shown in FIG. 11, at step 600, three images R, G, and B are captured. Image R may correspond to a red image (i.e., an image captured using an image sensor having an associated red color filter), image G may correspond to a green image (i.e., an image captured using an image sensor having an associated green color filter), and image B may correspond to a blue image (i.e., an image captured using an image sensor having an associated blue color filter). In the example of FIG. 11, three images are captured using three image sensors and green image G is used as a reference image (i.e., red image R and blue image B are corrected to match green image G). In practice any number of image sensors may be used and any one image sensor may be chosen as the reference image sensor. At step 602 of FIG. 11, edge images such as edge image 304 of FIG. 6 may be computed based on each image R, G, and B. Edge images 304 may be computed using a Sobel operator as described in connection with FIG. 6 or any other edge detection operator. At step 604, global parallax corrections may be compute using processing circuitry 18 by projecting edge images computed in step 602 onto one-dimensional projection curves. One-dimensional horizontal and vertical projection curves may be used to determine global horizontal and vertical parallax corrections of images R and B with respect to image G as described in connection with FIG. 7.

At step 606, a local matching procedure is carried out in which images R, G, and B (and associated edge images) are subdivided using processing circuitry 18 into image blocks. Image blocks such as image blocks 400 of FIGS. 8A, 8B and 8C may be used to determine block parallax correction vectors as described in connection with FIG. 9. Block parallax correction vectors may be determined using a block matching procedure in which a shift is determined for each image block in images R and B (and associated edge images) with respect to image G. Block image correction vectors may be stored in a local parallax correction map 500 as described in connection with FIG. 9. At step 608, block image correction vectors associated with incorrect shifts in local parallax correction map 500 may be discarded based on a color saturation checking procedure. As described in connection with FIG. 9, a block color saturation checking procedure may include computing a block color ratio BCR between the block color energy $BCE_{R(B)}$ of block of a red (or blue) image, with the block color energy $BCE_G$ of a block of a green image. If block color ratio BCE is larger than the predetermined threshold, the block parallax correction vector of the block may be discarded. The block parallax correction vector of the block may be replaced with an interpolation of block parallax correction vectors associated with neighboring blocks.

At step 610, local parallax correction map 500 may be further improved by smoothing local parallax correction map 500. Smoothing local parallax correction map 500 may be performed using processing circuitry 500 by convolving local parallax correction map 500 with a smoothing filter (e.g., a median filter or other suitable low-pass filter). At step 612 in a cross-checking procedure local parallax correction maps 500 associated with images R and B, respectively may be cross-checked.

Block parallax correction vectors associated with a image R not having associated block parallax correction vectors associated with image B with opposite signs may be discarded. Discarded block parallax correction vector may be replaced with an interpolation of block parallax correction vectors associated with neighboring blocks.

At step 614, processing circuitry may be used to perform a compensation procedure in which image blocks in image R are shifted (i.e., pixel values in a given block are reassigned to pixels of a shifted block) based on the associated block parallax correction vectors in the local parallax correction map 500 associated with image R. Similarly, image blocks associated with image B are shifted based on the associated block parallax correction vectors in the local parallax correction map 500 associated with image B. In parallel with step 614, at step 616, a depth map associated with images R and B, respectively, may be generated. The depth map may be generated using processing circuitry 18 to compute magnitudes of each block parallax correction vector in local parallax correction map 500 and invert the computed magnitudes or by other suitable methods. Depth mapping may also be performed by combing local parallax correction maps 500 determined from multiple images captured by multiple image sensors. The example of FIG. 11 describes a parallax correction method for three color images and is merely illustrative. The method may be extended to images captured using any number of offset image sensors.

Various embodiments have been described illustrating methods for parallax correction and depth mapping for array cameras that include arrays of image sensors and lenses. In particular, a global and local parallax correction may be determined. A global parallax correction may be determined by projecting edge images based on images captured by each image sensor onto one-dimensional horizontal and vertical projection curves. Global parallax corrections may be based on offsets in horizontal and vertical projection curves associated with different image sensors. Local parallax corrections may be determined using a block matching procedure in which test portions (blocks) of one image are matched with overlapping test portions (blocks) of another image by computing a block energy difference. The block matching procedure may include matching expanded test blocks in one image to overlapping expanded test blocks in another image. The block matching procedure may be improved by comparing the lowest block energy difference for each block to a threshold and if the lowest block energy difference is higher than the threshold, breaking each test block into sub-portions and matching the test sub-portions in one image (or expanded test sub-portions) to overlapping test sub-portions (or expanded test sub-portions) of another image.

Further improvements to local parallax corrections may be generated using a relative block color saturation test, a smoothing of parallax corrections with a low-pass filter and, if desired, using a cross-check between parallax corrections determined for multiple image sensors. Expanded image blocks may be used in the block matching procedure to provide more reliable block matching while preserving small block size. As the magnitude of a parallax offset is inversely proportional to the 3-dimensional distance of an object from an imaging device, depth maps may be generated from parallax corrections determined during the block matching procedure.

The foregoing is merely illustrative of the principles of this invention which can be practiced in other embodiments.

What is claimed is:

1. A method of global parallax correction for an array camera having at least first and second image sensors and processing circuitry, the method comprising:
  capturing first and second images using the first and second image sensors, respectively, wherein the first and second images contain at least one object having edges;
  with the processing circuitry, computing first and second edge images based on the first and second images, respectively, wherein the first and second edge images contain the edges of the at least one object in the first and second images; and with the processing circuitry, generating a first global parallax correction based on the first and second edge images, wherein generating the first global parallax correction based on the first and second edge images comprises:
with the processing circuitry, computing a first horizontal projection curve based on a horizontal projection of the first edge image and a second horizontal projection curve based on a horizontal projection of the second edge image.

2. The method defined in claim 1 wherein computing the first and second edge images based on the first and second images, respectively, comprises:
with the processing circuitry, convolving the first and second images with an edge detection operator such that the first and second edge images contain only the edges of the at least one object, and wherein other portions of the at least one object are suppressed in the first and second edge images.

3. The method defined in claim 2 wherein generating the first global parallax correction based on the first and second edge images further comprises:
with the processing circuitry, computing a first vertical projection curve based on a vertical projection of the first edge image and a second vertical projection curve based on a vertical projection of the second edge image.

4. The method defined in claim 3 wherein generating the first global parallax correction based on the first and second edge images further comprises:
with the processing circuitry, generating a global horizontal parallax correction based on a first offset between the first and second horizontal projection curves; and
with the processing circuitry, generating a global vertical parallax correction based on a second offset between the first and second vertical projection curves.

5. The method defined in claim 4 wherein the array camera comprises additional image sensors, the method further comprising:
with the additional image sensors, capturing additional images wherein the additional images contain the at least one object having edges;
with the processing circuitry, generating additional edge images based on the additional images, wherein each of the additional edge images contain the edges of the at least one object in each of the additional images; and
with the processing circuitry, computing additional global parallax corrections based on the additional edge images.

6. The method defined in claim 5 wherein the second image sensor is configured to receive light through a green color filter, wherein the first global parallax correction comprises a shift between the first image and the second image, and wherein the additional global parallax corrections comprise additional shifts between the additional images and the second image.

7. A method of local parallax correction for an array camera having at least first and second image sensors and processing circuitry, the method comprising:
capturing first and second images using the first and second image sensors respectively, wherein the first image comprises a plurality of image blocks;
with the processing circuitry, generating a local parallax correction map, wherein the local parallax correction map comprises a plurality of block parallax correction vectors corresponding to the plurality of image blocks and wherein generating the local parallax correction map comprises:
with the processing circuitry, generating the plurality of block parallax correction vectors corresponding to the plurality of image blocks by matching each one of the plurality of image blocks in the first image to a corresponding matched block in the second image;
with the processing circuitry computing a block color energy based on each one of the image blocks in the first image and the corresponding matched block in the second image; and
with the processing circuitry, comparing the block color energy to a threshold.

8. The method defined in claim 7 wherein matching each one of the plurality of image blocks in the first image to the corresponding matched block in the second image comprises:
with the processing circuitry, computing a block energy difference based on each one of the plurality of image blocks in the first image and a plurality of overlapping test blocks in the second image.

9. The method defined in claim 8, further comprising:
with the processing software, generating first and second edge images based on the first and second images respectively, wherein the first and second images contain at least one object having edges, and wherein the first and second edge images contain the edges of the at least one object in the first and second images.

10. The method defined in claim 9 wherein computing the block energy difference based on each one of the plurality of image blocks in the first image and the plurality of overlapping test blocks in the second image further comprises:
with the processing circuitry, computing the block energy difference based on each one of a plurality of image blocks in the first edge image and a plurality of overlapping test blocks in the second edge image.

11. The method defined in claim 10 wherein the array camera comprises additional image sensors, the method further comprising:
with the additional image sensors, capturing additional images, wherein the additional images contain the at least one object having edges;
with the processing circuitry, generating additional edge images based on the additional images, wherein each of the additional edge images contain the edges of the at least one object in each of the additional images; and
with the processing circuitry, computing additional local parallax correction maps based on the additional images and the additional edge images.

12. The method defined in claim 11, further comprising:
with the processing circuitry, cross-checking the local parallax correction map with each of the additional local parallax correction maps.

13. A method of parallax correction for array cameras having an array of image sensors and processing circuitry, the method comprising:
with each image sensor of the array of image sensors, capturing an image, wherein a first one of the images comprises a reference image;
with the processing circuitry, generating a global parallax correction corresponding to each image that represents a shift between each image and the reference image; and
with the processing circuitry, generating a plurality of local parallax correction vectors corresponding to a plurality of portions of each image, wherein each local parallax correction vector represents a shift between one of the plurality of portions of each image and a corresponding portion of the reference image.

14. The method defined in claim 13, further comprising:
with the processing circuitry, generating a depth map based on the plurality of local parallax correction vectors.

15. The method defined in claim 14 wherein generating the global parallax correction corresponding to each image comprises:
with the processing circuitry, generating an edge image from each image;
with the processing circuitry, generating a plurality of projection curves from each edge image;
with the processing circuitry, computing horizontal and vertical offsets between the projection curves of the images and the projection curves of the reference image.

16. The method defined in claim 15 wherein generating the plurality of local parallax corrections corresponding to the plurality of portions of each image comprises:
with the processing circuitry, storing the plurality of local parallax correction vectors corresponding to the plurality of portions of each image in a local parallax correction map corresponding to each image;
with the processing circuitry, eliminating some of the local parallax correction vectors using a block color saturation checking procedure;
with the processing circuitry, smoothing the local parallax correction map; and
with the processing circuitry, performing a cross-check of at least two of the local parallax correction maps corresponding to at least two of the images.

17. The method defined in claim 16 wherein generating the plurality of local parallax correction vectors corresponding to the plurality of portions of each image comprises:
with the processing circuitry, computing a plurality of block energy differences based on a plurality of expanded test blocks corresponding to the plurality of portions of each image.

18. The method defined in claim 17 wherein computing a plurality of block energy differences based on a plurality of expanded test blocks corresponding to the plurality of portions of each image further comprises:
with the processing circuitry, comparing a lowest one of the plurality of block energy differences to a threshold; and
with the processing circuitry, if the lowest one of the plurality of block energy differences is higher than the threshold, computing an additional plurality of block energy differences based on a plurality of expanded test blocks corresponding to a plurality of sub-portions of each image, wherein the plurality of sub-portions of each image are smaller the plurality of portions of each image.

* * * * *